July 1, 1969

D. A. MACHTIG 3,452,663

CONVERTER PLATE

Filed May 11, 1967

INVENTOR.
DUANE A. MACHTIG
BY Robert Charles H
ATTORNEY

United States Patent Office 3,452,663
Patented July 1, 1969

3,452,663
CONVERTER PLATE
Duane A. Machtig, Newark, Calif., assignor to The Bank of California, National Association, San Francisco, Calif.
Filed May 11, 1967, Ser. No. 637,657
Int. Cl. G03b 17/56
U.S. Cl. 95—86      2 Claims

ABSTRACT OF THE DISCLOSURE

A converter plate to correct for the angle between the bottom surface of a pistol grip on a camera and for focal axis of the camera. The converter plate has a flat bottom and an inclined top. The inclined top has a depression and the flat bottom has a recess. A threaded opening extends from the depression to the flat bottom and another threaded opening extends from the depression to the recess.

Background of the invention

*Field of the invention.*—A converter plate is provided which corrects for the tilt on the bottom surface of a pistol grip movie camera so that the camera can be used on a copy stand or other flat surface and the focus of the camera will be parallel to the flat surface to which it is attached.

*Description of the prior art.*—A search was made on this device prior to the filing of the application. The following patents were uncovered in the search:

2,922,609, Jan. 26, 1960, Collier
2,942,537, June 28, 1960, Zimmerman
3,006,052, Oct. 31, 1961, Stickney et al.
3,062,114, Nov. 6, 1962, Palos These structures are not suitable and cannot be easily adapted for the purpose of this invention.

Summary of the invention

The current trend in home movie cameras favors a camera having a pistol grip arrangement depending from the body of the camera. This pistol grip arrangement allows easy handling of the camera and greatly reduces accidental breakage or dropping of the camera. Certain of these cameras having the piston grip arrangement however, and in particular some of the foreign makes, have the bottom of the pistol grip terminating in a planar surface which is not parallel to the lens arrangement of the camera. This type of pistol grip structure can be sometimes troublesome when it is desired to use the movie camera on a copy stand necessitating the lens being parallel to the stand. This is required for various types of photographic procedures, such as animation work or the like.

Applicant has overcome the above problem by providing a converter plate which has an inclined top planed to a predetermined angle relative to a flat bottom so that when the camera is attached to the converter plate and the converter plate in turn is attached to the copy stand the lens arrangement of the camera will be parallel to the copy stand.

The primary object of this invention is to provide a new and improved converter plate.

Another object of the invention is to provide a converter plate which is relatively simple to construct but which is also very durable and will withstand extensive usage.

Description of the preferred embodiments

Figure 1:
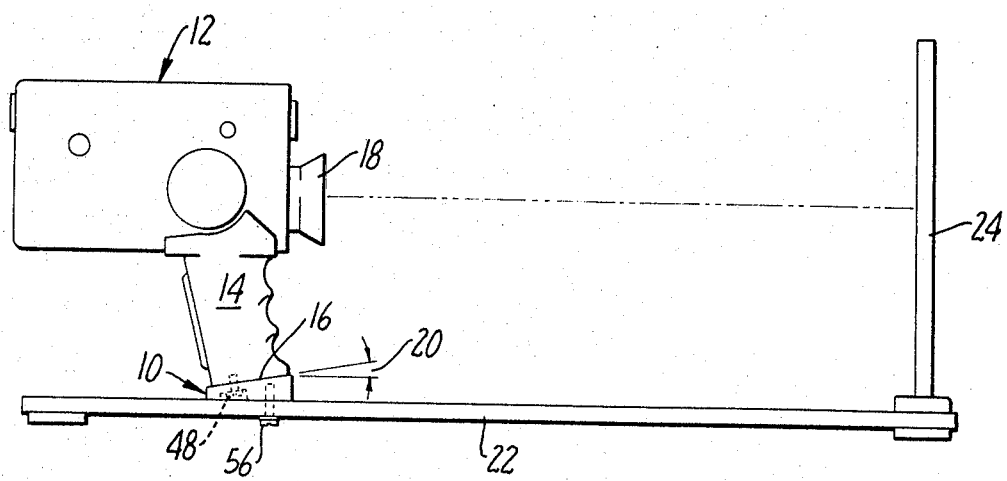
FIGURE 1 is a side elevational view showing a camera having a pistol grip arrangement attached to a copy stand by means of the converter plate of the present invention.

Referring particularly to FIGURE 1, a converter plate, generally indicated 10, is illustrated which is intended for use in conjunction with a movie camera 12 which has a pistol grip handle arrangement 14 depending therefrom which terminates in a planar surface 16 which is not parallel to the lens 18 of the camera 12. The angle indicated between arrows as 20 is the amount of correction which the converter plate 10 must make between the planar surface 16 and the copy stand 22 so that the lens arrangement 18 is parallel to the copy stand or flat surface 22 when it is focused on screen 24 which is upstanding from copy stand 22.

Figure 2:
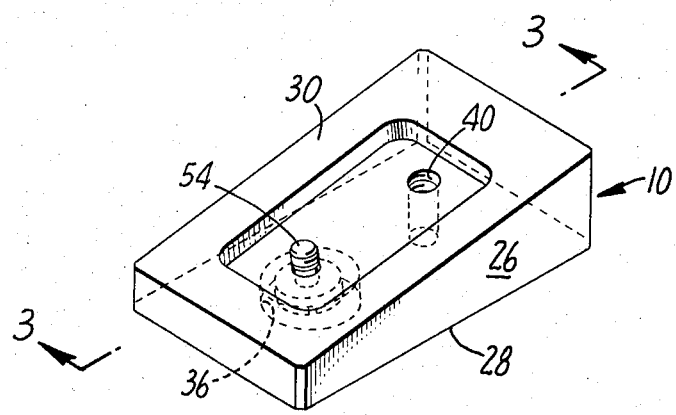
FIGURE 2 is an isometric view partially in section illustrating the converter plate.
Figure 3:
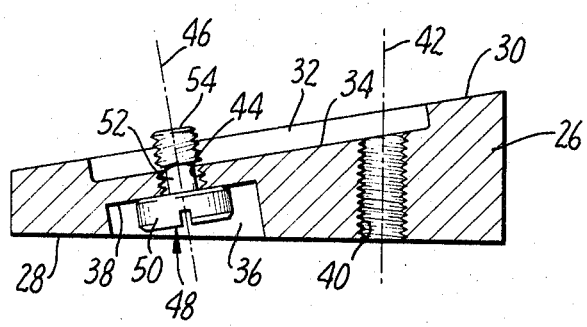
FIGURE 3 is a view taken substantially as indicated along line 3—3 of FIGURE 2 illustrating the threaded openings in the converter plate.

Referring in detail to the converter plate 10 and in particular to FIGURES 2 and 3, it will be seen that the converter plate 10 has a base member 26 which has a flat bottom 28 and an inclined top 30. Depression 32 is centrally located within inclined top 30 and has a bottom 34 which is parallel with the inclined top 30. In like manner flat bottom 28 has a recess 36 which has a top 38 which is also parallel with inclined top 30 and in turn parallel with the bottom 34 of the depression 32. Extending from the depression 32 to the flat bottom 28 is a first threaded opening 40 having an axis indicated by line 42 perpendicular to flat bottom 28. A second threaded opening 44 extends from the depression 32 to the recess 36 and has an axis indicated by line 46 which is perpendicular to the inclined top 30.

Into second threaded opening 44 is rotated a screw, generally indicated 48 (FIGURE 3), having a head portion 50, a nonthreaded portion 52 and a threaded portion 54 which matches the threads of the second threaded opening 44. The screw 48 is constructed so that the nonthreaded portion 52 fits within the threaded opening 44 and is of such a length as to extend a slightly greater distance than the threaded opening 44 and the threaded portion 54 of the screw 48 must be of such a length that it extends from the bottom 34 of the depression 32 some distance above the inclined top 30. Once the screw 48 is in position as illustrated in FIGURE 3 the head 50 is rotated so that the threaded portion 54 engages suitable threaded part of the pistol grip handle arrangement 14. When the converter plate 10 and the camera 12 are thus in locked arrangement, the converter plate 10 can then be attached to the copy stand 22 by means of conventional screw 56 (FIGURE 1) which is rotatably inserted into the first threaded opening 40.

By means of the above arrangement, the lens 18 of the camera 12 is now parallel to the copy stand 22 because the inclined top 30 compensates for the angle 20 of the planar surface 16 of the camera 12 relative to the copy stand 22. A differently angled converted plate is required for each camera having a differently angled planar surface 16 on the bottom of the pistol grip handle 14. Since the axis 42 is perpendicular to flat bottom 28 and the axis 46 is perpendicular to inclined top 30 and the head 50 of screw 48 fits within the recess 36 and the screw 56 does not extend above threaded opening 40 to such an extent that it interferes with the planar surface 16, there is nothing to interfere with the predetermined relationship between the inclined top 30 and the flat bottom 28. This allows an accurate and reliable arrangement for positioning the camera 12 in the desired relationship relative to the copy stand 22.

While the converter plate 10 in this application has been shown in relationship to a camera and a copy stand, it should be understood that this converter plate could be used in any other circumstance where it is desired to have two differently angled structures in parallel relationship thereto.

The converter plate 10 can be made of any durable material which will not easily scratch, nick, bend or otherwise lose the predetermined angled relationship between the inclined top 30 and the flat bottom 28. Materials such as metal and hard rubber have been found satisfactory in usage.

The foregoing detailed description has been given for clearness of understanding only and no unnecessary limitations should be incorporated therefrom for many modifications will be obvious to those skilled in the art.

I claim:
1. A converter plate comprising:
    (a) a base member having a flat bottom and an inclined top;
    (b) a depression in said inclined top having a bottom, said bottom of said depression being parallel with said inclined top;
    (c) a recess in said flat bottom having a top thereof, said top of said recess being parallel with said inclined top; and
    (d) said base member formed with a first threaded opening extending from said depression to said flat bottom and a second threaded opening extending from said depression to said recess.
2. The converter plate of claim 1 wherein the first threaded opening has an axis perpendicular to said flat bottom and the second threaded opening has an axis perpendicular to said inclined top.

References Cited
UNITED STATES PATENTS

| | | | |
|---|---|---|---|
| 1,972,000 | 8/1934 | Warner | 95—86 |
| 2,922,609 | 1/1960 | Collier | 248—179 |
| 2,942,537 | 6/1960 | Zimmerman | 95—1.1 |
| 3,006,052 | 10/1961 | Stickney | 24—263 |
| 3,062,114 | 11/1962 | Palos | 352—131 |
| 3,301,627 | 1/1967 | Kimura | 95—86 |

NORTON ANSHER, *Primary Examiner.*

LEO H. McCORMICK, Jr., *Assistant Examiner.*

U.S. Cl. X.R.

248—178, 188.2; 252—243